United States Patent
Morello et al.

[11] Patent Number: 5,829,937
[45] Date of Patent: Nov. 3, 1998

[54] TOLERANCE CLIP

[75] Inventors: John Raymond Morello, Lake Milton, Ohio; James Thomas Stocz, Greer, S.C.; Daniel Howard Huff, Austintown, Ohio; Michael John Reitz, Birmingham, Ala.; Doru Matei, Esslingen; Rolf Grübingo, Baden Baden, both of Germany

[73] Assignees: General Motors Corporation, Detroit, Mich.; Mercedes-Benz AG, Stuttgart, Germany

[21] Appl. No.: 743,609

[22] Filed: Nov. 4, 1996

[51] Int. Cl.$^6$ .................................................. F16B 19/00
[52] U.S. Cl. ............................ 411/510; 411/508; 411/908
[58] Field of Search ............................... 24/297; 411/84, 411/85, 107, 508, 509, 510, 908, 913, 966, 970, 999; 248/225.11

[56] References Cited

U.S. PATENT DOCUMENTS

| | | | |
|---|---|---|---|
| 3,776,092 | 12/1973 | Seckerson | 85/5 R |
| 3,860,999 | 1/1975 | Meyer | 411/510 |
| 4,505,611 | 3/1985 | Nagashima et al. | |
| 4,568,215 | 2/1986 | Nelson | 411/510 |
| 4,712,256 | 12/1987 | Stairs, Jr. | 411/508 |
| 4,947,610 | 8/1990 | Koerner | 411/508 |
| 5,012,995 | 5/1991 | Ward et al. | 248/68.1 |
| 5,129,768 | 7/1992 | Hoyle et al. | 411/508 |
| 5,271,586 | 12/1993 | Schmidt | 411/85 |
| 5,324,151 | 6/1994 | Szudarek et al. | 411/510 |
| 5,505,411 | 4/1996 | Heaton et al. | 248/70 |

FOREIGN PATENT DOCUMENTS

2390611 A 12/1978 France.
2702720 A 9/1994 France.

OTHER PUBLICATIONS

Research Disclosure No. 355, 1 Nov. 1993, "Automotive Interior Trim Fastener Means".
Patent Abstracts of Japan vol. 010, No. 092 (M–468), 9 Apr. 1986 & JP 60 229840 A.
European Search Report for EP 97 20 3097 corres to USSN 8/743,609.

*Primary Examiner*—Kenneth J. Dorner
*Assistant Examiner*—Robert G. Santos
*Attorney, Agent, or Firm*—Cary W. Brooks

[57] ABSTRACT

The invention includes a single-piece clip for securing an article(s) to a panel having a hole formed therein. The clip includes a tape bar having a slot formed in the bar and at least one portion of the bar for securing to the article such as a wire harness by taping or other suitable means. The clip also includes a stem extending through the slot and having an insertion head at one end for inserting through the hole in a panel and engaging the rear face of the panel. A first set of wings extend outwardly from the stem at a location below the insertion head and above a top surface of the tape bar. A second set of wings extend outwardly from the stem at one end of the stem and below a bottom face of the tape bar. Both sets of wings have a breadth sufficient to prevent the wings from being pulled or pushed through the slot formed in the tape bar.

5 Claims, 2 Drawing Sheets

TOLERANCE CLIP

TECHNICAL FIELD

This invention relates to clips for holding an article(s) to a panel having a through hole formed therein.

BACKGROUND OF THE INVENTION

Seckerson, U.S. Pat. No. 3,776,092, issued Dec. 4, 1993 discloses a fastener including a head and a shank which projects normally from the underside of the head. The fastener is formed with two upstanding arms that are adapted to grip a single cable. The head of the fastener is inserted in a circular aperture formed in a panel. The head is constructed and arranged such that once it is inserted through the aperture it engages the opposite side of the wall to frictionally hold the fixture in place. However, this single piece fastener is not capable of holding a multitude of cables or a wire harness.

Heaton et al, U.S. Pat. No. 5,505,411, issued Apr. 9, 1996, discloses a harness fixing device. The two-piece fixing device includes a tape bar having two flat raised portions at either end which are secured to a harness by taping, and a flat central lower portion which is displaced out of the plane of the end portions. The displacement of the ends from the central portion is great enough to allow one of the fastenings freely moved along the bar when the bar ends are fixed to the harness, allowing securement of the fastening to displaced holes in a panel which the harness is to be fixed. The two-piece fastening device includes a well-known arrowhead clip for passing through a hole in a panel, a radial clip plate for retaining the clip at right angles to the plane of the panel and an eyelet having a rectangular hole through which the tape bar can be inserted. In the assembly of the two-piece fastening device, the convoluted shape of the tape bar must be navigated through the rectangular hole in the clip which may be troublesome and certainly has an additional cost associated with the labor of assembling the two pieces.

The present invention provides alternatives and advantages over the prior art.

SUMMARY OF THE INVENTION

The invention includes a single-piece clip for securing an article(s) to a panel having a hole formed therein. The clip includes a tape bar having a slot formed in the bar and at least one portion of the bar for securing to the article such as a wire harness by taping or other suitable means. The clip also includes a stem extending through the slot and having an insertion head at one end for inserting through the hole in a panel and engaging the rear face of the panel. A first set of wings extend outwardly from the stem at a location below the insertion head and above a top surface of the tape bar. A second set of wings extend outwardly from the stem at one end of the stem and below a bottom face of the tape bar. Both sets of wings have a breadth sufficient to prevent the wings from being pulled or pushed through the slot formed in the tape bar.

These and other objects, features and advantages of the present invention will be apparent from the following brief description of the drawings, detailed descriptions and appended claims and drawings.

DETAILED DESCRIPTION

Figure 1:
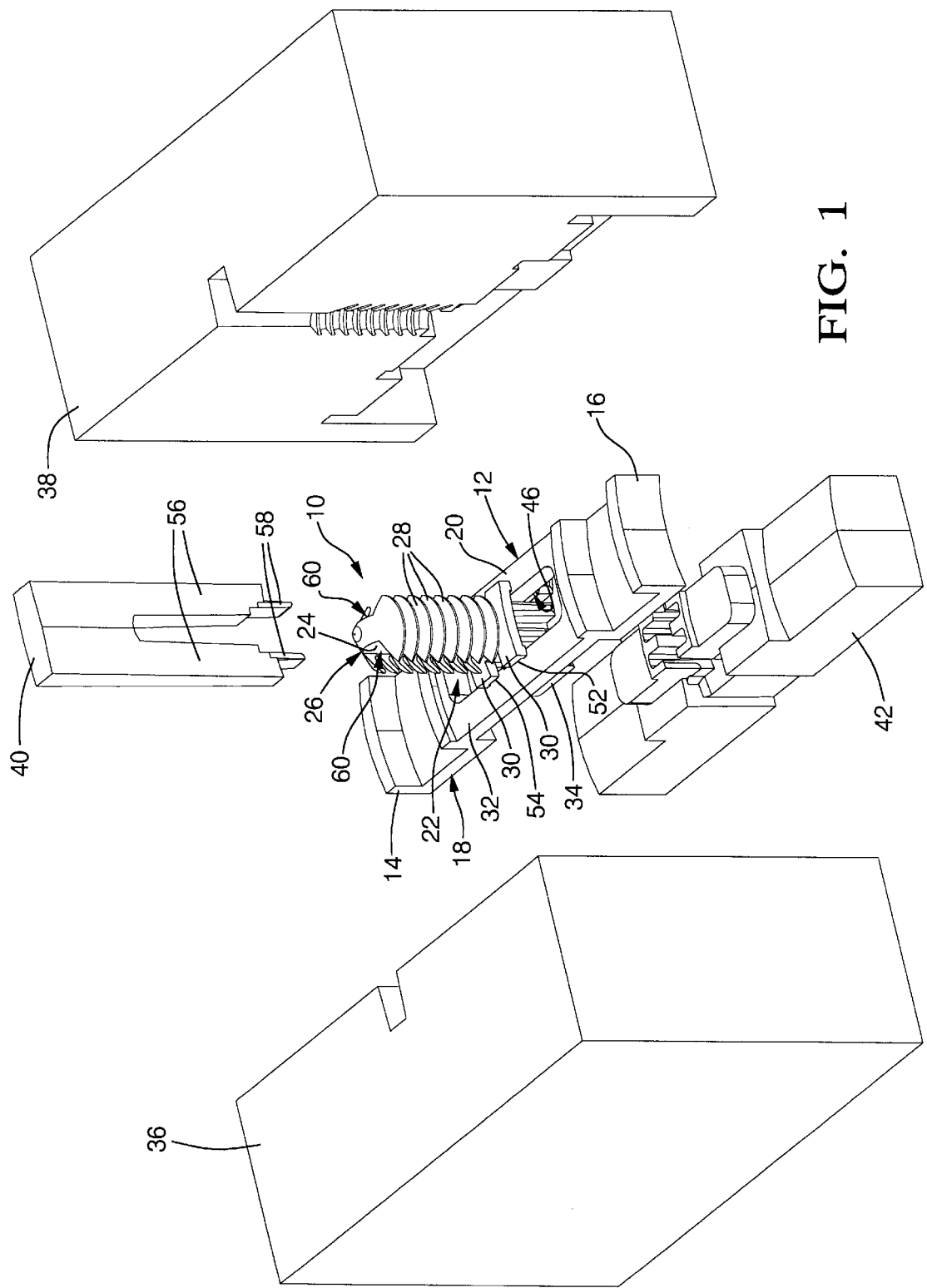
FIG. 1 is a perspective view of a tolerance clip according to the present invention.

FIG. 1 illustrates a tolerance clip 10 according to the present invention. The tolerance clip includes a tape bar 12 which preferably has a first and second end 14, 16 which may be utilized for taping to another article(s) such as a wire harness used in an automobile. The wire harness may be positioned to run parallel to the longitudinal axis of the tape bar and a bottom surface 18 of the tape bar. The first and second ends 14, 16 of the tape bar have a U-shaped configuration for receiving tape and preventing the same from slipping off of the tape bar. Preferably the center body portion 20 of the tape bar includes an elongated slot 22. The clip also includes an elongated stem 24 having an insertion head 26 near one end which has of a fern or Christmas tree type configuration including a plurality of barbs 28 extending outwardly from the stem. A first stop or set of spaced apart wings 30 extend outwardly from the stem below the insertion head and above a top surface 32 of the tape bar. The stem 24 extends through the slot 22 in the tape bar and a second stop or wing 34 extend outwardly from another end of the stem 24. Both sets of wings 30, 34 have a length sufficient to prevent the wings from being moved through the elongated slot 22. Preferably the wings are made from a substantially rigid material preventing the wings from being either pulled through or pushed through the elongated slot. So constructed, the stem may be moved along the elongated slot to compensate for misalignment of aperture or hole formed in the vehicle body panel or the miss-taping of the tape bar to a wire harness.

Figure 2:
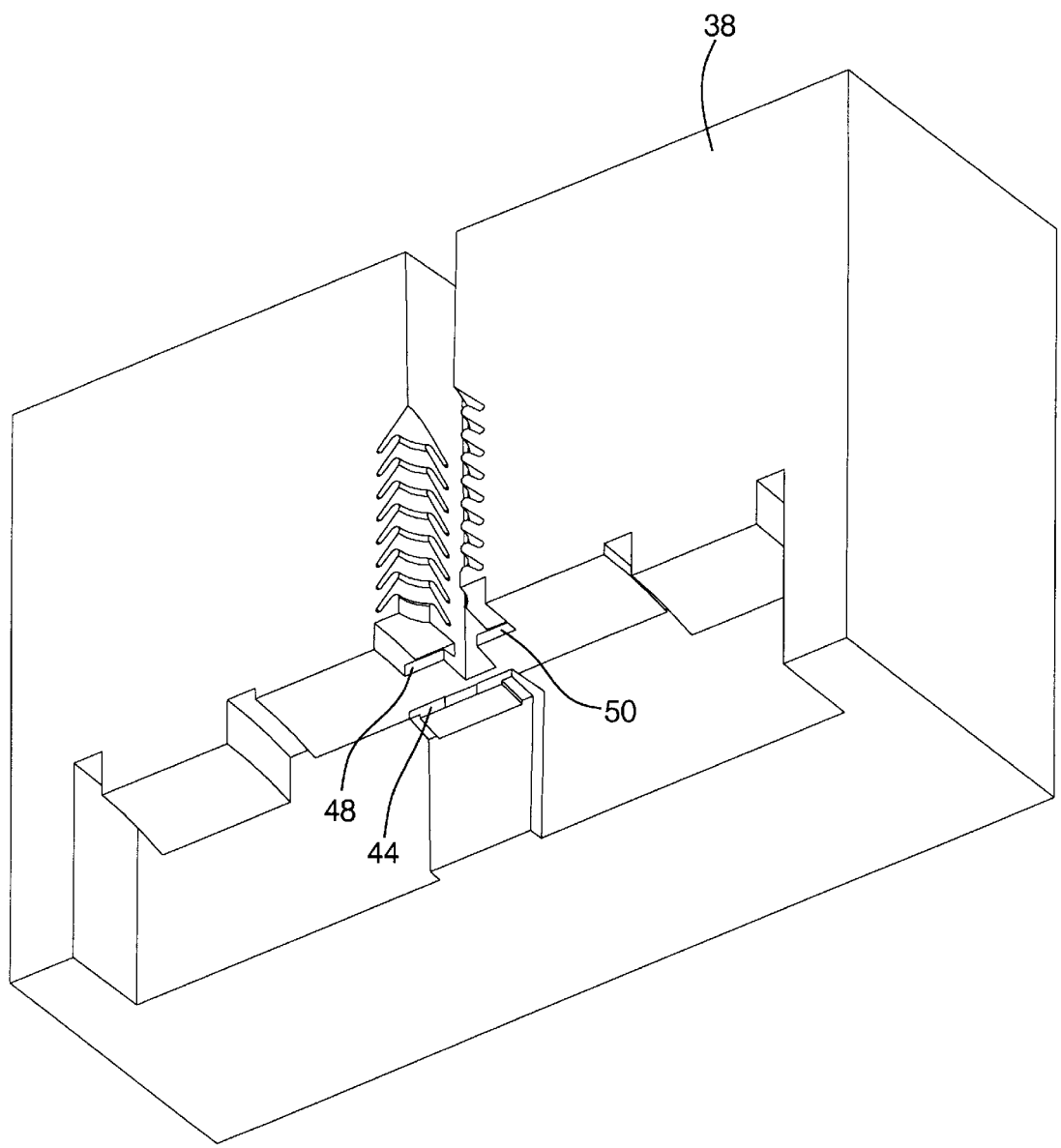
FIG. 2 illustrates an injection mold die half used in making a tolerance clip according to the present invention.

Preferably the clip according to the present invention is made from a single plastic mold injection operation and no assembly of the tape bar and stem is required. The molding operation utilizes a four-piece die mold construction having first and second substantially identical side die halves 36, 38, a top die insert 40, and a bottom die insert 42. The four-die parts come together to form a die having a cavity mirroring the configuration of the clip according to the present invention. As shown in FIG. 2, the two side die halves 36, 38 each have a first lower shutoff ledge 44 extending outwardly corresponding to the space 46 provided between the lower surface 18 of the tape bar and the lower wing 34 extending outwardly from the stem 24. The first and second die halves 36, 38 also include second and third spaced apart shutoff ledges 48, 50 respectively, extending outwardly from the die halves above the first shutoff ledge 44 and corresponding to the spaces 52, 54 provided between the upper surface of the tape bar and the upper set of wings 30 extending outwardly from the stem. A top insert 40 has a U-shaped configuration and two downwardly extending legs 56 and attached narrow feet 58 each shutting off on a corresponding first shutoff ledge 34 on the two die halves 36, 38. Each of the legs 56 of U-shaped top insert forms a groove 60 in the insertion head 26 which allows for lower insertion force for pushing the head 26 into the aperture of a panel of a vehicle. A lower die insert 42 is provided and has features corresponding to the lower surface of the tape bar and a lower portion of the clip. Runner gates may be provided at locations as desired but preferably are provided in the areas corresponding to the ends 14, 16 of the tape bar and the lower wing 34 of the clip. The clip according to the present invention may be made from a nylon material under standard molding temperature and pressure procedures for such nylon.

We claim:

1. A tolerance clip comprising:

a bar having a portion for securing to an object, and the bar having an elongated slot formed therein, the slot being closed at opposite ends;

a stem extending through the slot for slidable movement in the slot;

an insertion head at one end of the stem for inserting through an aperture formed in a panel and for engaging a rear face of the panel and securing the object to the panel;

a first stop extending outwardly from another end of the stem and below a bottom surface of the bar, and further comprising a second stop extending outwardly from the stem at a location below the insertion head and above a top surface of the bar, and wherein the first and second stops are made from a rigid material and constructed and arranged so that the first and second stops cannot be pushed through or pulled through the slot, and the tolerance clip being made from a single step plastic mold injection operation and so that no assembly of the tape bar and stem is required.

2. A tolerance clip as set forth in claim 1 wherein said first stop comprises a wing extending outwardly from the stem.

3. A tolerance clip as set forth in claim 1 wherein said second stop comprises a wing extending outwardly from the stem.

4. A tolerance clip as set forth in claim 1 which is a single piece.

5. A tolerance clip comprising:

a bar having a portion for securing to an object, and the bar having an elongated slot formed therein, the slot being closed at opposite ends;

a stem extending through the slot for slidable movement in the slot;

an attachment head at one end of the stem for attaching to a panel;

a first stop extending outwardly from another end of the stem and below a bottom surface of the bar, and further comprising a second stop extending outwardly from the stem at a location below the attachment head and above a top surface of the bar, and wherein the first and second stops are made from a rigid material and constructed and arranged so that the first and second stops cannot be pushed through or pulled through the slot, and the tolerance clip being made from a single step plastic mold injection operation and so that no assembly of the tape bar and stem is required.

* * * * *